(No Model.)

W. W. BATCHELDER.
Continuous Match.

No. 241,780.                     Patented May 24, 1881.

WITNESSES:
W. W. Hollingsworth
Edw. W. Byrn.

INVENTOR:
W. W. Batchelder
BY
ATTORNEYS.

UNITED STATES PATENT OFFICE.

WILLIAM W. BATCHELDER, OF NEW YORK, N. Y.

CONTINUOUS MATCH.

SPECIFICATION forming part of Letters Patent No. 241,780, dated May 24, 1881.

Application filed March 8, 1881. (No model.)

*To all whom it may concern:*

Be it known that I, WILLIAM W. BATCHELDER, of the city, county, and State of New York, have invented a new and useful Continuous Match; and I do hereby declare that the following is a full, clear, and exact description of the same, reference being had to the accompanying drawings, forming part of this specification, in which—

Figure 1:
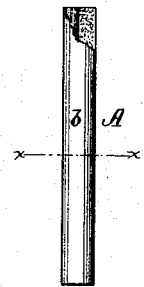
Figure 2:
Figure 3:
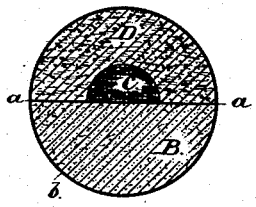

Figure 1 is a side view of the continuous match with a portion of the outer skin torn off. Fig. 2 is an end view; and Fig. 3 is a cross-section through line $x$ $x$, considerably enlarged to show the longitudinal sections of materials forming the match.

My invention relates to a novel article of manufacture which I designate a "continuous match," for the reason that the entire length or body of the match is made of the explosive compositions, which are so arranged as to flash at will without continuously burning.

My invention follows the general principle described in my Patent No. 201,485, March 19, 1878, in which two chambers are arranged side by side, and are filled with sticks of different compositions, which will not burn or explode when separated, but will flash or explode by friction when mixed and rubbed by the devices provided for the accomplishment of that result.

My present improvement consists in molding, compressing, or otherwise forming these different compositions into a single match or igniting-pencil, which preserves its shape and integrity from cohesive attraction without the necessity for any chamber for holding it, the different compositions being separated from each other by a partition, and provided with a casing which wears away as the match is used, all as hereinafter more fully described.

In the drawings, A represents my improved continuous match, which may be made of two or more different compositions, which are formed into a solid single pencil, with the different compositions separated by a thin partition or septum, and a thin skin or casing on the outside, which casing and partition are made of such material as will wear away by the abrasion employed in using the match.

In the selection of the materials for forming the several compositions the main requirements are a composition of one kind that has a great affinity for oxygen, and a composition of another kind that is rich in oxygen, in connection with which two principal compositions I prefer to use a third, which shall be in the nature of an inert or refractory substance, which simply reduces the energy of the explosion to make a sufficient but less violent flash.

I do not confine myself to any particular shape of the match in cross-section, nor to any particular material, so long as the composition rich in oxygen and the composition having an affinity for oxygen are kept separate. In practice, however, I prefer to make the entire match or pencil in a cylindrical shape, with the compositions distributed throughout its cross-sectional area, as shown in enlarged view in Fig. 3.

B is the composition rich in oxygen, which I prefer to make of three parts of chlorate of potash and one part of binoxide of lead. C is the composition which has a special affinity for oxygen, which, by preference, is amorphous phosphorus. This occupies a relatively small area, as shown. D is the refractory or inert substance, which I make, by preference, of one part of plaster-of-paris and two parts of ground asphaltum.

In constructing the pencil the inert substance D is pressed or formed with a groove in it, which receives the amorphous phosphorus C and forms a half-cylinder, while the other half-cylinder is made of the mixture of chlorate of potash and binoxide of lead. This arrangement completely incloses the phosphorus and protects it from the influence of the weather. Before fastening the two half-cylinders together a thin septum or partition, $a$, is placed between, so as to separate the phosphorus from the oxygen-supplying composition, and afterward said half-cylinders are fastened together to make a rigid whole, and a jacket, skin, or casing, $b$, placed around the cylinder. For this septum and casing I prefer tissue-paper soaked in soluble glass. This sufficiently separates the materials and wears down as the match is used.

This article is designed to be used for all purposes of lighting; but it finds a special application for cigar-lighters and in attachments to gas-burners for lighting gas.

This match may be used in any manner, or in connection with any device in which the scraping together and rubbing of the materials can be effected; but it is specially adapted to devices which I have invented for that purpose, which I have described in two other applications for patents filed of even date herewith.

Having thus described my invention, what I claim as new is—

1. A solid continuous match or igniting-pencil composed of longitudinal sections of two or more compositions which do not ignite when separate, but ignite from friction when mixed, as described.

2. A solid continuous match or igniting-pencil composed of longitudinal sections of two or more compositions which do not ignite when separate, but ignite from friction when mixed, the said compositions being separated by a septum which wears away as the match is used, as described.

3. A solid continuous match or igniting-pencil composed of longitudinal sections of two or more compositions which do not ignite when separate, but ignite from friction when mixed, the said compositions being separated by a septum and the pencil surrounded by a casing of a material which wears away as the match is used, as described.

4. A solid continuous match or igniting-pencil composed of longitudinal sections of an igniting-composition, B, an ignitible composition, C, and a longitudinal section composed of an inert substance, as and for the purpose described.

5. The combination, with the igniting-section B and the ignitible section C, of a septum composed of tissue-paper soaked in soluble glass, as and for the purpose described.

6. The continuous match or igniting-pencil composed of the igniting-section B, the ignitible section C, and inert section D, with the section C inclosed, substantially as shown and described.

W. W. BATCHELDER.

Witnesses:
CHAS. A. PETTIT,
EDWD. W. BYRN.